United States Patent
Iizuka et al.

(10) Patent No.: US 9,461,772 B2
(45) Date of Patent: Oct. 4, 2016

(54) COMMUNICATION APPARATUS, COMMUNICATION STATE DETECTING METHOD, AND COMMUNICATION STATE DETECTING PROGRAM

(75) Inventors: Hiroyuki Iizuka, Tokyo (JP); Toshiyasu Tanaka, Tokyo (JP); Koichi Yoshimura, Tokyo (JP); Masahito Iwai, Tokyo (JP); Tetsuya Ito, Tokyo (JP)

(73) Assignee: NEC Communication Systems, Ltd., Tokyo (JP)

(*) Notice: Subject to any disclaimer, the term of this patent is extended or adjusted under 35 U.S.C. 154(b) by 287 days.

(21) Appl. No.: 14/342,223

(22) PCT Filed: Jul. 24, 2012

(86) PCT No.: PCT/JP2012/068730
§ 371 (c)(1),
(2), (4) Date: Feb. 28, 2014

(87) PCT Pub. No.: WO2013/035451
PCT Pub. Date: Mar. 14, 2013

(65) Prior Publication Data
US 2014/0226758 A1 Aug. 14, 2014

(30) Foreign Application Priority Data
Sep. 5, 2011 (JP) .................................. 2011-192640

(51) Int. Cl.
*H04L 12/26* (2006.01)
*H04L 1/00* (2006.01)
(Continued)

(52) U.S. Cl.
CPC .......... *H04L 1/0023* (2013.01); *H04L 27/2605* (2013.01); *H04W 52/0206* (2013.01)

(58) Field of Classification Search
CPC ........... H04L 1/0023; H04L 27/2605; H04W 52/0206

USPC ........ 370/230–232, 250–253, 395.5–395.53; 709/220–225, 231–234
See application file for complete search history.

(56) References Cited

U.S. PATENT DOCUMENTS 7,385,924 B1* 6/2008 Riddle ................ H04L 12/2602
370/235
(Continued)

FOREIGN PATENT DOCUMENTS

| JP | 2002-262333 | 9/2002 |
| JP | 2008-197910 | 8/2008 |

(Continued)

OTHER PUBLICATIONS

Notice of Allowance issued by the Japan Patent Office for Japanese Patent Application No. 2013-532494 mailed Jan. 6, 2015 (4 pgs.).
(Continued)

*Primary Examiner* — Thai Hoang
(74) *Attorney, Agent, or Firm* — Wilmer Cutler Pickering Hale and Dorr LLP (57) ABSTRACT

A packet interval (a time difference between sequentially received packets) in a certain previous time is calculated and a cumulative distribution function of the calculated packet interval is obtained. Meanwhile, a function value-corresponding to-flow end that is a boundary value of the cumulative distribution function to be considered as a flow end (timeout) in the range of a cumulative distribution function value is stored. From the cumulative distribution function obtained as described above, a value of a packet interval mapped to a cumulative distribution function value that matches the function value-corresponding to-flow end is set as a threshold. That is, the threshold is dynamically set based on a previous packet interval. Therefore, a packet stop period from a last packet reception time to a current time is measured, and it is detected as a flow timeout at a timing when the measured value is equal to or greater than the threshold.

4 Claims, 11 Drawing Sheets

(51) Int. Cl.
*H04L 27/26* (2006.01)
*H04W 52/02* (2009.01)

(56) References Cited

U.S. PATENT DOCUMENTS

| | | | | |
|---|---|---|---|---|
| 7,426,181 | B1* | 9/2008 | Feroz | H04L 47/10 370/230 |
| 7,457,870 | B1* | 11/2008 | Lownsbrough | H04L 41/5058 709/217 |
| 7,843,843 | B1* | 11/2010 | Papp, III | H04L 12/26 370/252 |
| 8,793,361 | B1* | 7/2014 | Riddle | H04L 47/2441 709/224 |
| 2003/0219014 | A1* | 11/2003 | Kotabe | H04L 12/5693 370/375 |
| 2010/0080246 | A1 | 4/2010 | Iwakura et al. | |
| 2010/0284300 | A1* | 11/2010 | Deshpande | H04L 43/026 370/253 |
| 2011/0075583 | A1 | 3/2011 | Imai et al. | |

FOREIGN PATENT DOCUMENTS

| | | |
|---|---|---|
| JP | 2008-197910 A | 8/2008 |
| JP | 2010-041644 | 2/2010 |
| JP | 2010-081343 | 4/2010 |
| JP | 2011-077954 | 4/2011 |

OTHER PUBLICATIONS

Kang, I. and Kim, H., "Determining Embryonic Connection Timeout in Stateful Inspection," ICC '03, IEEE International Conference on Communications, vol. 1, pp. 458-462 (Mar. 2003).
International Search Report corresponding to PCT/JP2012/068730, dated Sep. 12, 2012; 2 pages.
International Search Report corresponding to PCT/JP2012/068730, dated Sep. 25, 2012; 4 pages.

* cited by examiner

| | 131a | 131b | 131c | 131d | 131e | 131f |
|---|---|---|---|---|---|---|
| 130 | SOURCE IP ADDRESS | DESTINATION IP ADDRESS | PROTOCOL NUMBER | SOURCE PORT NUMBER | DESTINATION PORT NUMBER | RECEPTION TIME |
| | ..... | ..... | ..... | ..... | ..... | ..... |
| | 100.100.100.1 | 200.200.200.1 | 6 | 10000 | 20000 | 2010/4/8 14:05:00 |
| 131 | 101.101.101.1 | 201.201.201.1 | 6 | 10001 | 20001 | 2010/4/8 14:05:10 |

| PACKET INTERVAL (SECONDS) | CUMULATIVE DISTRIBUTION FUNCTION |
|---|---|
| ⋮ | ⋮ |
| 60 | 0.9888 |
| ⋮ | ⋮ |
| 69 | 0.9899 |
| 70 | 0.9901 |
| ⋮ | ⋮ |
| 120 | 0.9937 |
| ⋮ | ⋮ |

COMMUNICATION APPARATUS, COMMUNICATION STATE DETECTING METHOD, AND COMMUNICATION STATE DETECTING PROGRAM

CROSS-REFERENCE TO RELATED APPLICATIONS

This application is a national stage application of International Application No. PCT/JP2012/068730 entitled "Communication Apparatus, Communication State Detecting Method, And Communication State Detecting Program," filed on Jul. 24, 2012, which claims the benefit of the priority of Japanese Patent Application No. 2011-192640, filed on Sep. 5, 2011, the disclosures of each of which are hereby incorporated by reference in their entirety.

TECHNICAL FIELD

The present invention relates to a communication apparatus used to transmit and receiving data via a communication network such as a network, a communication state detecting method used to detect the end of communication as a communication state, and a communication state detecting program.

BACKGROUND ART

In general, a data communication apparatus used to perform data transfer control such as a router, a switch, or an access point is operated in a state of continuously running including not only when data communication is performed but also when no data communication is performed.

In such an operation, since power is consumed even when no communication is performed, unnecessary power consumption occurs from this viewpoint. Therefore, if control is performed such that the data communication apparatus enters a sleep state when no communication is performed, it is possible to reduce power consumption.

In order to appropriately set the sleep state corresponding to a period of no communication, it is necessary to accurately detect a timing at which data communication ends. A transmission control protocol (TCP) is widely used as a communication protocol over a network. In the TCP, it is prescribed that a communication terminal apparatus which wishes to terminate communication needs to turn an FIN flag or an RST flag on included in a TCP header. Therefore, as it is detected that the FIN flag or the RST flag included in a received packet is turned on, it is possible to detect an end timing of data communication.

However, in a best effort type network, due to disconnection of a communication line, a communication path failure, or unexpected power off of a communication apparatus, there is a possibility of communication being forcibly terminated before a communication transaction is finished. In this case, since communication ends while the FIN flag or the RST flag is set off, it is difficult to detect a communication end timing.

Therefore, a technique of determining a case in which a next frame is not acquired within a predetermined time after a previous frame is acquired as a timeout has been known (for example, refer to Patent Document 1). In such a configuration, even when communication is terminated while the FIN flag or the RST flag is set off due to some causes, it is possible to obtain a result corresponding to the detection of the communication end timing.

DOCUMENTS OF THE PRIOR ART

Patent Document

[Patent Document 1]
Japanese Unexamined Patent Application, First Publication No. 2008-197910.

DISCLOSURE OF INVENTION

Problems to be Solved by the Invention

However, in the configuration disclosed in Patent Document 1, it is difficult to appropriately set a predetermined time used for timeout determination. As a specific example, when a relatively short predetermined time is set as, for example, about one second, a communication stop state for this amount of time is highly likely to occur in normal packet communication. Accordingly, despite the fact that the communication is originally normal, an accidentally occurring communication stop state of one second or more is likely to be erroneously detected as a communication end timing.

On the other hand, when a considerably long predetermined time of for example, about 600 seconds, is set, it is possible to detect forcible communication termination with high probability. However, it is difficult to obtain a detection result before a considerably long time of about 600 seconds has passed. As a result, there is a problem in that a start timing of a communication end detection process is significantly delayed.

Therefore, the present invention provides a communication apparatus, a communication state detecting method, and a program which can address the above-described problems.

Means for Solving the Problem

In view of the aforementioned problems, according to an aspect of the invention, there is provided a communication apparatus. The communication apparatus includes a threshold setting unit configured to set a threshold based on a packet interval that is a difference of reception times of an earlier packet and a later packet in a plurality of previously received packets and a timeout detecting unit configured to detect whether a flow ends based on comparison of a packet stop period from a last packet reception time to a current time and the threshold.

In addition, according to another aspect of the invention, there is provided a communication state detecting method. The method includes setting a threshold based on a packet interval that is the difference of reception times of an earlier packet and a later packet in a plurality of previously received packets, and detecting a timeout by detecting whether a flow ends based on comparison of a packet stop period from a last packet reception time to a current time and the threshold.

According to still another aspect of the invention, there is provided a communication state detecting program causing a computer to function as a threshold setting unit configured to set a threshold based on a packet interval that is a difference of reception times of an earlier packet and a later packet in a plurality of previously received packets, and a timeout detecting unit configured to detect whether a flow ends based on comparison of a packet stop period from a last packet reception time to a current time and the threshold.

Effects of the Invention

In communication state detection according to the present invention, a predetermined time for determining a timeout of data communication is appropriately set. In this way, it is possible to increase precision of data communication end timing detection.

EMBODIMENTS FOR CARRYING OUT THE INVENTION

[Exemplary Configuration of Communication System]

Figure 1:
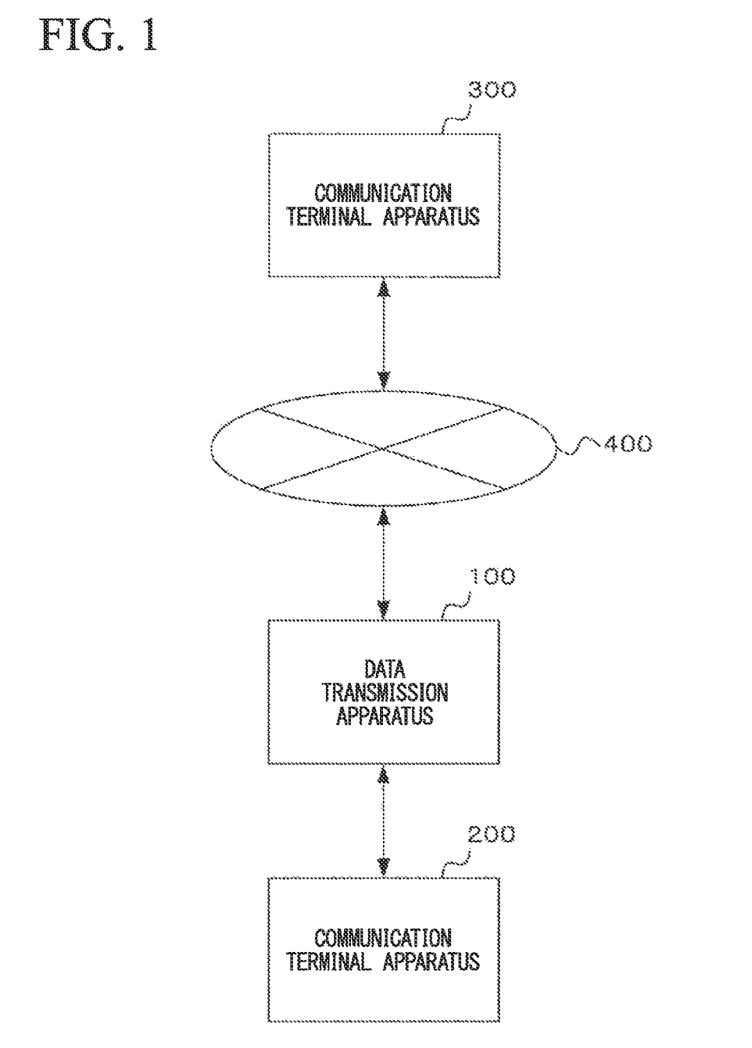
FIG. 1 is a block diagram representing a communication system including a data transmission apparatus according to an embodiment of the present invention.

FIG. 1 illustrates an exemplary configuration of a communication system including a data transmission apparatus 100 as a communication apparatus according to an embodiment of the present invention. The data transmission apparatus 100 illustrated in FIG. 1 is connected to a communication terminal apparatus 200 via, for example, a local area network (LAN), and is also connected to a communication terminal apparatus 300 via a backbone network 400, for example, the Internet. Thus, the data transmission apparatus 100 relays packet data that is transmitted and received between the communication terminal apparatus 200 and the communication terminal apparatus 300. In other words, a communication packet transmitted from the communication terminal apparatus 200 is forwarded to the communication terminal apparatus 300 via the backbone network 400. In addition, a packet transmitted from the communication terminal apparatus 300 via the backbone network 400 is forwarded to the communication terminal apparatus 200.

[Exemplary Configuration of Data Transmission Apparatus]

Figure 2:
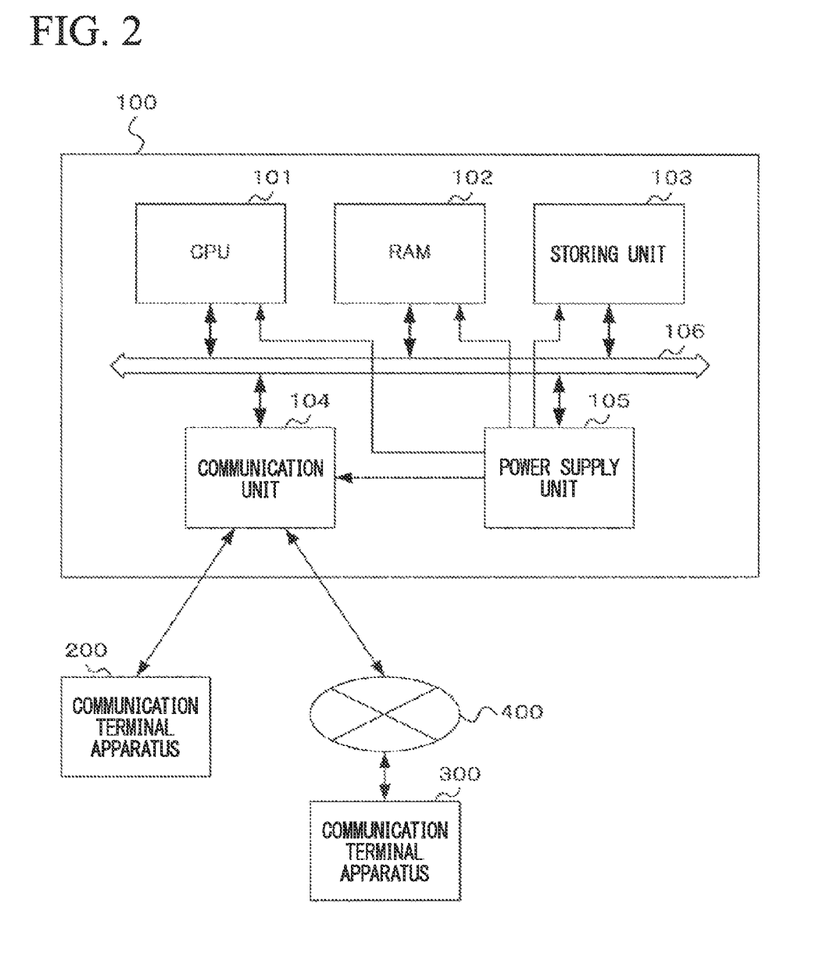
FIG. 2 is a block diagram representing an exemplary configuration of the data transmission apparatus according to the present embodiment.

FIG. 2 illustrates an exemplary configuration of the data transmission apparatus 100. The data transmission apparatus 100 illustrated in this figure includes a central processing unit (CPU) 101, a random access memory (RAM) 102, a storing unit 103, a communication unit 104 and a power supply unit 105. These units are connected through a data bus 106.

The CPU 101 implements a predetermined function as the data transmission apparatus 100 by executing a program stored in the storing unit 103.

The RAM 102 functions as a main memory, and reads and deploys a program to be executed by the CPU 101 from the storing unit 103. In addition, the RAM 102 is used as a working space when the CPU 101 executes arithmetic processing.

The storing unit 103 functions as an auxiliary storage device and stores a program to be executed by the CPU 101 and various kinds of data. In addition, the storing unit 103 may include a semiconductor memory device, for example, a hard disk or a flash memory.

The communication unit 104 performs communication with other communication terminal apparatus through a transmission path such as the LAN or the backbone network 400. In the embodiment, the communication terminal apparatus 200 or the communication terminal apparatus 300 is connected to the LAN or the backbone network 400. In this manner, the communication unit 104 may perform communication with the communication terminal apparatus 200 and the communication terminal apparatus 300.

The power supply unit 105 converts power supplied from a commercial alternating current (AC) power supply or a battery to power supply voltage of a predetermined value using direct current (DC), supplies the power supply voltage to a chip or a board corresponding to each unit illustrated in FIG. 2. In addition, the power supply unit 105 sets a sleep state such that power supply voltage to be supplied to a predetermined unit is stopped or a voltage value is changed depending on sleep control by the CPU 101.

[Exemplary Functional Configuration of Data Transmission Apparatus]

Figure 3:
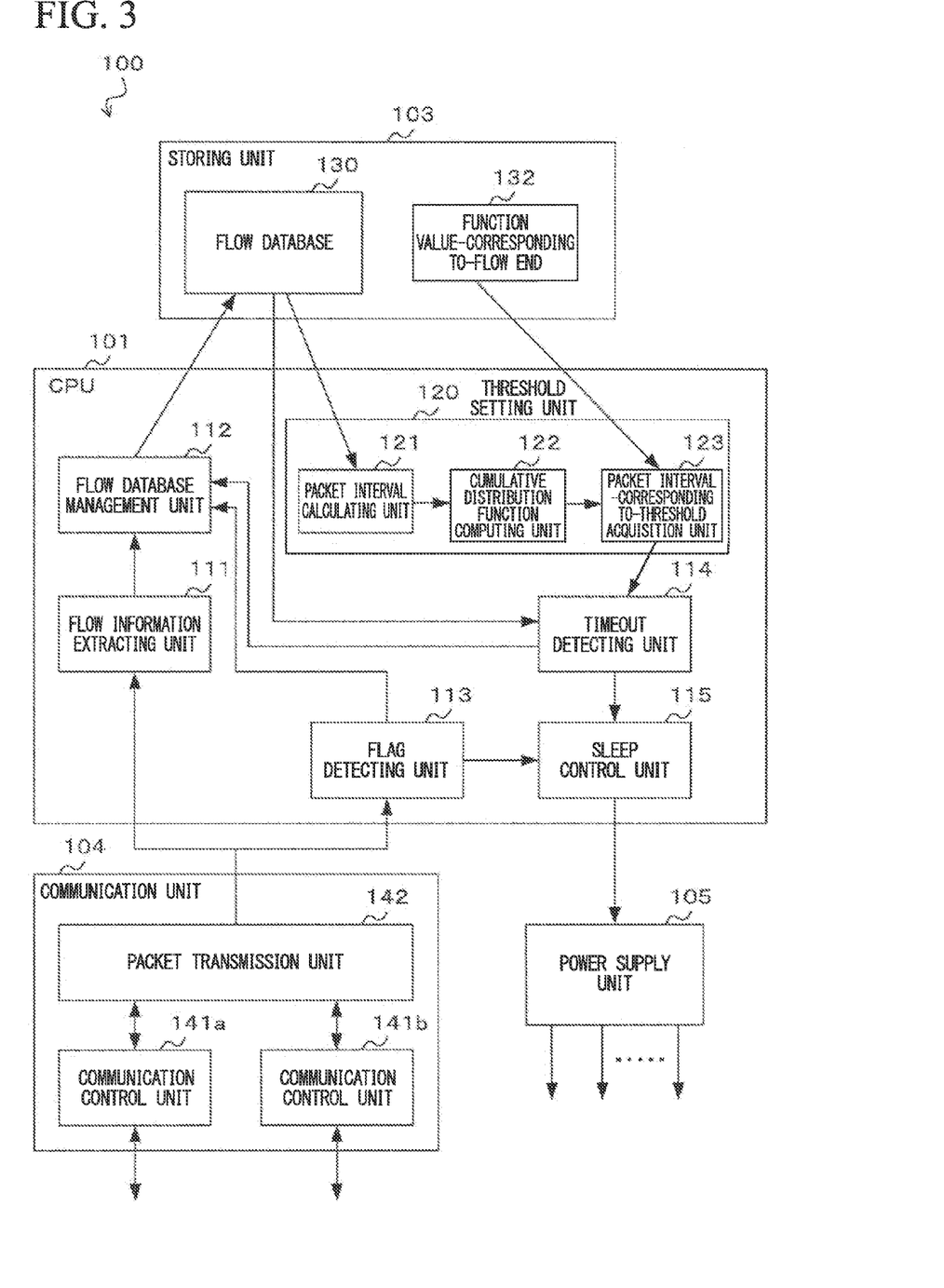
FIG. 3 is a block diagram representing an exemplary functional configuration of the data transmission apparatus according to the present embodiment

FIG. 3 illustrates an exemplary functional configuration for sleep control that is implemented such that the CPU 101 of the data transmission apparatus 100 executes a program. In addition, in FIG. 3, a flow database 130 and a function value-corresponding to-flow end 132 are illustrated as data corresponding to the sleep control among data stored in the storing unit 103.

In addition, a configuration of the communication unit 104 is illustrated in FIG. 3. The communication unit 104 includes communication control units 141a and 141b and a packet transmission unit 142. The communication control units 141a and 141b execute communication control such as routing. Here, it is assumed that the communication terminal apparatus 200 is connected to the communication control unit 141a via a transmission path of the LAN and the communication terminal apparatus 300 is connected to the communication control unit 141b via the backbone network 400. The packet transmission unit 142 executes predetermined control, for example, congestion control, on data transmission between communication terminal apparatuses.

In the communication unit 104 having the aforementioned configuration, a packet transmitted from the communication terminal apparatus 200 is received by the communication control unit 141a and is output to the packet transmission unit 142. The packet transmission unit 142 performs the congestion control on the packet input from the communication control unit 141a and outputs the packet to the communication control unit 141b at a predetermined timing. The communication control unit 141b determines a path used to transmit the packet input from the packet transmission unit 142 to the communication terminal apparatus 300 and transmits the packet through the path.

In addition, on the other hand, a packet transmitted from the communication terminal apparatus 300 is input from the communication control unit 141*b* to the packet transmission unit 142. The packet transmission unit 142 performs the congestion control on the input packet and outputs the input packet to the communication control unit 141*a* at a predetermined timing. The communication control unit 141*a* determines a path used to transmit the packet input from the packet transmission unit 142 to the communication terminal apparatus 200 and transmits the packet through the path.

As functional units related to the sleep control implemented by the CPU 101, FIG. 3 illustrates a flow information extracting unit 111, a flow database management unit 112, a flag detecting unit 113, a threshold setting unit 120, a timeout detecting unit 114 and a sleep control unit 115.

The flow information extracting unit 111 extracts flow information from each packet input to the packet transmission unit 142.

Here, the term "flow" refers to a unit of a packet group that is transmitted and received among a plurality of the same communication terminal apparatuses and stores data processed by the same application. The term "flow information" refers to a group of information necessary to uniquely specify the flow among information stored in a field of a header (IP header and TCP header) in a packet, and specifically, includes a source IP address, a destination IP address, a protocol number, a source port number and a destination port number.

The source IP address is information stored in an Internet Protocol (IP) header and indicates an IP address of a communication terminal apparatus serving as a source of the packet. The destination IP address is information stored in the IP header and indicates an IP address of a communication terminal apparatus serving as a destination of the packet. The protocol number is information stored in the IP header and is a number indicating a type of a network protocol prescribed in a transport layer.

The source port number is information stored in a transmission control protocol (TCP) header and is a number indicating an application that has performed a process used to transmit the packet in a communication terminal apparatus serving as a source. The destination port number is information stored in the TCP header and is a number indicating an application to be designated as a destination of the packet. A flow of the packet is specified based on this information. In other words, an application and a communication terminal apparatus that transmits and receives packets are specified.

The flow database management unit 112 manages the flow database 130. Specifically, an entry is generated so as to correspond to each packet received by the packet transmission unit 142 and is registered in the flow database 130. An entry of a packet corresponding to a flow that is detected as a timeout by the timeout detecting unit 114 is removed from the flow database 130.

In addition, the entry is generated such that a reception time is mapped with flow information extracted by the flow information extracting unit 111 in correspondence with to each packet input by the packet transmission unit 142. The reception time indicates a time at which a corresponding packet is received, that is, a time at which the packet is input to the packet transmission unit 142.

Figure 4:
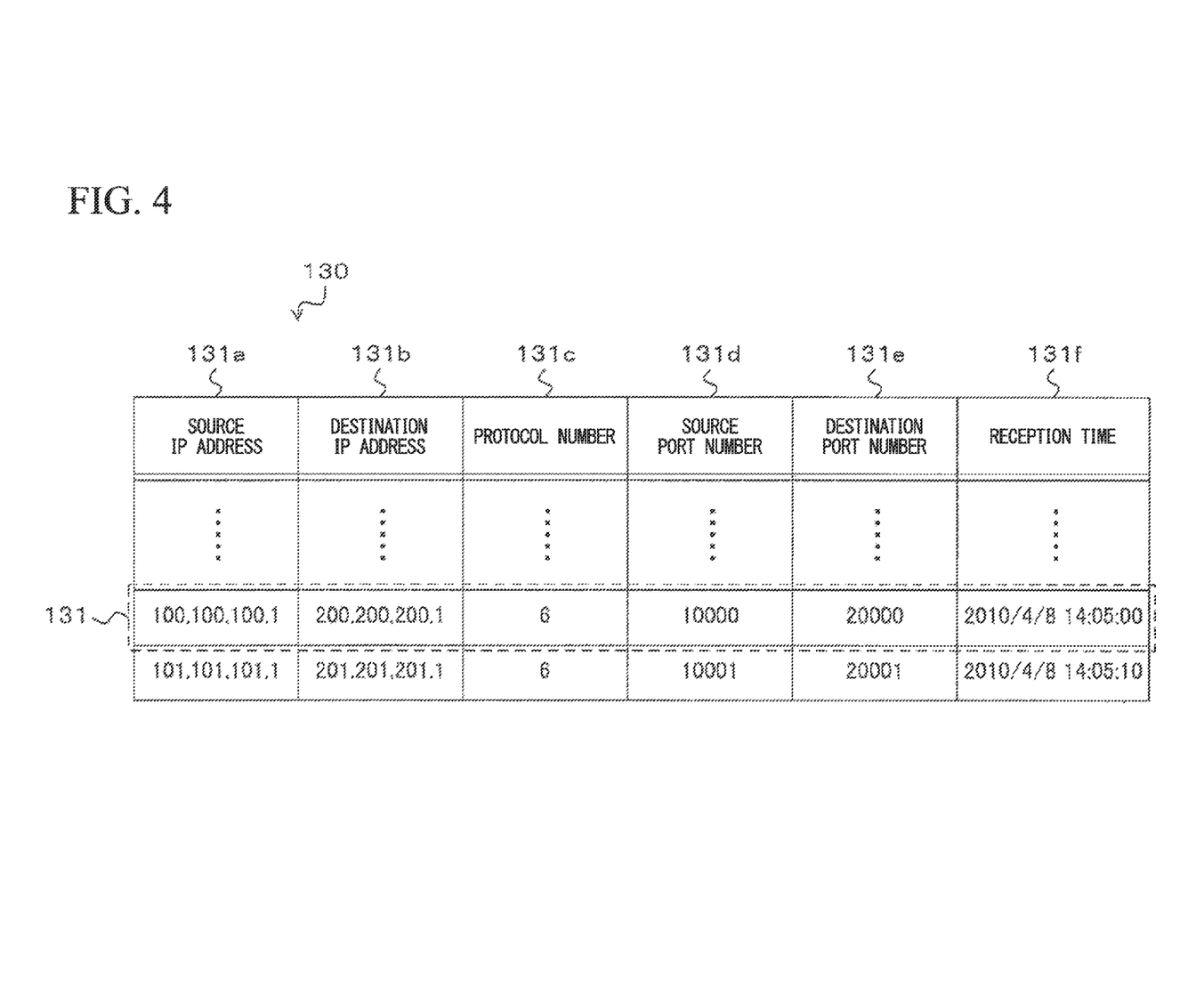
FIG. 4 is a table representing an exemplary structure of a flow database according to an embodiment of the present invention.

FIG. 4 illustrates an exemplary structure of the flow database 130. As illustrated, an entry 131 of the flow database 130 has a structure in which a source IP address 131*a*, a destination IP address 131*b*, a protocol number 131*c*, a source port number 131*d*, a destination port number 131*e* and a reception time 131*f* are mapped to each received packet.

Accordingly, it is possible to specify a flow corresponding to previously received packets with reference to the flow database 130.

Referring again to FIG. 3, the flag detecting unit 113 detects whether a flow ends based on a flag indicating a flow end stored in the received packet. Specifically, the flag detecting unit 113 detects whether an FIN flag included in the TCP header of the packet is set on for each packet acquired by the packet transmission unit 142. In addition, it is detected whether an RST flag included in the TCP header is set on.

The FIN flag is a one-bit field that is disposed in a predetermined position of the TCP header. A packet having the FIN flag set on indicates that there is no packet to be received later, that is, the end of the flow.

The RST flag is a one-bit field that is disposed in a predetermined position of the TCP header and is set when a TCP connection is suspended or denied. A node that has received a packet having the RST flag set on considers a connection request to be rejected and a current TCP connection to be discarded or forcibly ended. Therefore, even when the RST flag is set on, the end of the flow is indicated.

That is, the flag detecting unit 113 detects occurrence of the flow end by detecting that at least one of the FIN flag and the RST flag is set on.

Based on information stored in the storing unit 103, which is stored in in the flow database 130, and information on the function value-corresponding to-flow end 132, the threshold setting unit 120 dynamically sets a threshold used when the timeout detecting unit 114 detects a timeout in a flow stop period. Functional units in the threshold setting unit 120 illustrated in FIG. 3 and a threshold setting process of the functional units in the threshold setting unit 120 will be described below.

The timeout detecting unit 114 detects a timeout of a flow, that is, the end of the flow, by detecting a flow stop period longer than a predetermined time. To this end, the timeout detecting unit 114 acquires the reception time 131*f* of the entry 131 corresponding to the last packet among received packets from the flow database 130. Then, a time length of a period (packet stop period) from the acquired reception time to a current time is measured. Then, the measured value of the packet stop period and a threshold set by the threshold setting unit 120 are compared, and it is detected that the flow timeout has occurred when the packet stop period is equal to or greater than the threshold.

In this way, when the timeout is detected, it means that, for example, the FIN flag or the RST flag is not set on but flow communication is forcibly terminated due to a failure.

As can be understood from the above description, the data transmission apparatus 100 according to the embodiment detects the flow end based on the value of the FIN flag or the RST flag stored in the TCP header of the communication packet. In addition, along with the flag, the end of flow communication is also detected using flow timeout detection.

The sleep control unit 115 sets a sleep state in a period during which the flow stops depending on detection of the flow end. To this end, first, the sleep control unit 115 determines whether the sleep state is set at a timing at which the end of flow communication is detected. That is, the sleep control unit 115 determines whether the sleep state is set based on detection of the FIN flag or the RST flag set on using the flag detecting unit 113. In addition, the sleep control unit 115 determines whether the sleep state is set based on detection of timeout occurrence using the timeout detecting unit 114. Then, when it is determined that the sleep state is set, the power supply unit 105 is controlled such that the sleep state is set in the flow stop period during which flow communication stops.

The power supply unit 105 sets the sleep state by stopping supply of the power supply voltage to a predetermined unit including, for example, the CPU 101 or the RAM 102 under control of the sleep control unit 115. In addition, in setting of the sleep state, when a voltage value of the power supply voltage is to be a predetermined value lower than that of a start-up time, the power supply voltage is also changed to the predetermined value according to the sleep state.

[Exemplary Threshold Setting Using Threshold Setting Unit]

Next, exemplary threshold setting used to detect the timeout using the threshold setting unit 120 will be described. First, an exemplary functional configuration of the threshold setting unit 120 in FIG. 3 will be described. In FIG. 3, the threshold setting unit 120 includes a packet interval calculating unit 121, a cumulative distribution function computing unit 122 and a packet interval-corresponding to-threshold acquisition unit 123.

The packet interval calculating unit 121 uses information on the entry 131 stored in the flow database 130 and calculates a packet interval in a plurality of packets which correspond to each previously received flow.

Figure 5:
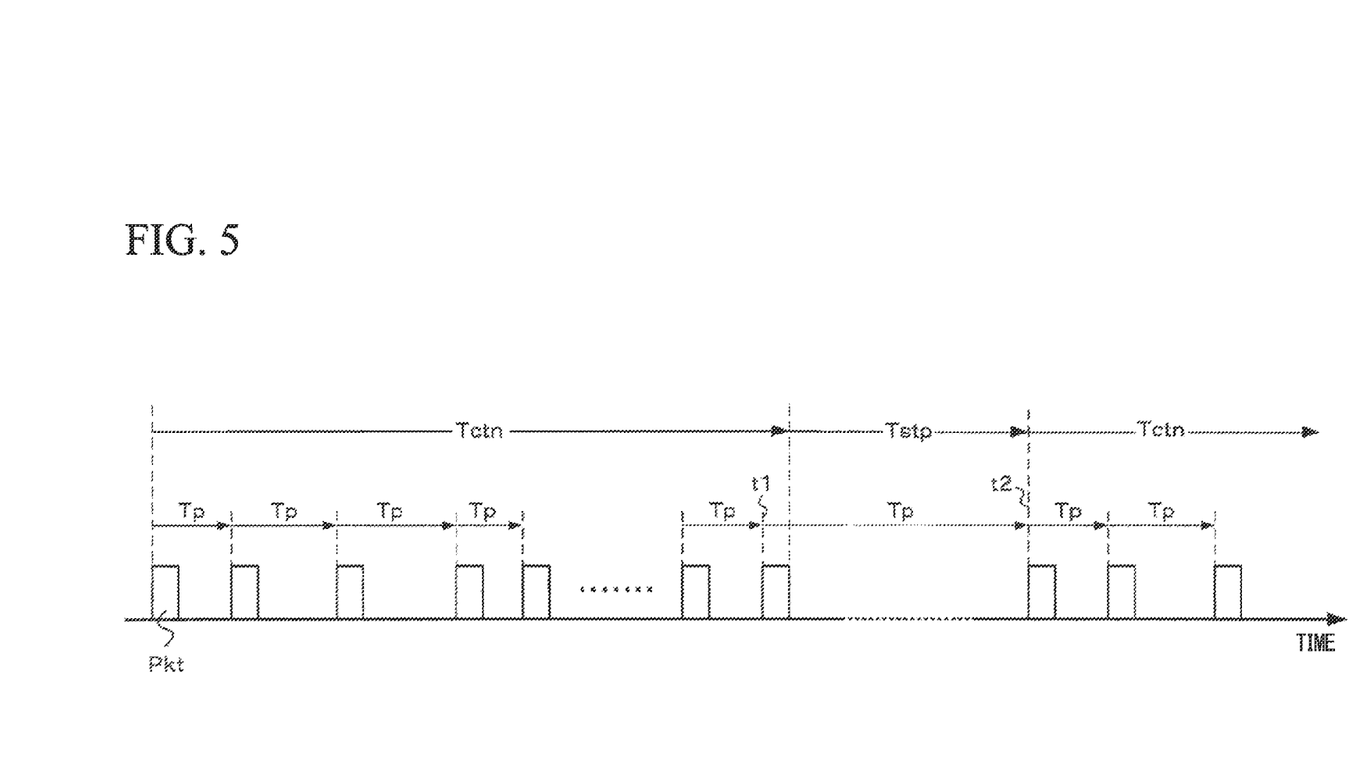
FIG. 5 is a timing chart representing an exemplary reception timing of packets according to an embodiment of the present invention.

A specific example of the packet interval calculated using the packet interval calculating unit 121 will be described with reference to FIG. 5. FIG. 5 illustrates packets Pkt received by the packet transmission unit 142 over time. A packet interval Tp to be calculated using the packet interval calculating unit 121 is a period from a time at which a packet Pkt is received to a time at which reception of a next packet Pkt is started in the same flow.

Then, the packet interval calculating unit 121 uses the flow database 130 in order to calculate the packet interval Tp. In other words, according to a sequence of the reception time 131f indicated in the entry 131, a time difference between a reception time 131f and a reception time 131f of a next packet is obtained. This obtained time difference is the packet interval Tp.

As schematically illustrated in FIG. 5, a timing at which the packet Pkt arrives is not constant. Accordingly, the packet interval Tp obtained as described above is also not constant. In addition, the packet interval calculating unit 121 measures the packet interval Tp not only in a flow continuation period Tctn regarded as the flow being continued but also in a flow stop period Tstp during which flow communication stops. That is, in FIG. 5, a period from a time t1 at which the last packet Pkt is received in the flow continuation period Tctn to a time t2 at which the flow stop period Tstp ends and an initial packet Pkt of a next flow continuation period Tctn is received is also measured as the packet interval Tp. In this manner, the packet interval calculating unit 121 calculates the packet interval Tp in a plurality of previously received packets.

The cumulative distribution function computing unit 122 calculates an appearance probability of the packet interval Tp calculated as described above using a cumulative distribution function. To this end, the cumulative distribution function computing unit 122 obtains, for example, a frequency distribution of an appearance frequency of the packet interval Tp calculated using the packet interval calculating unit 121.

Figure 6:
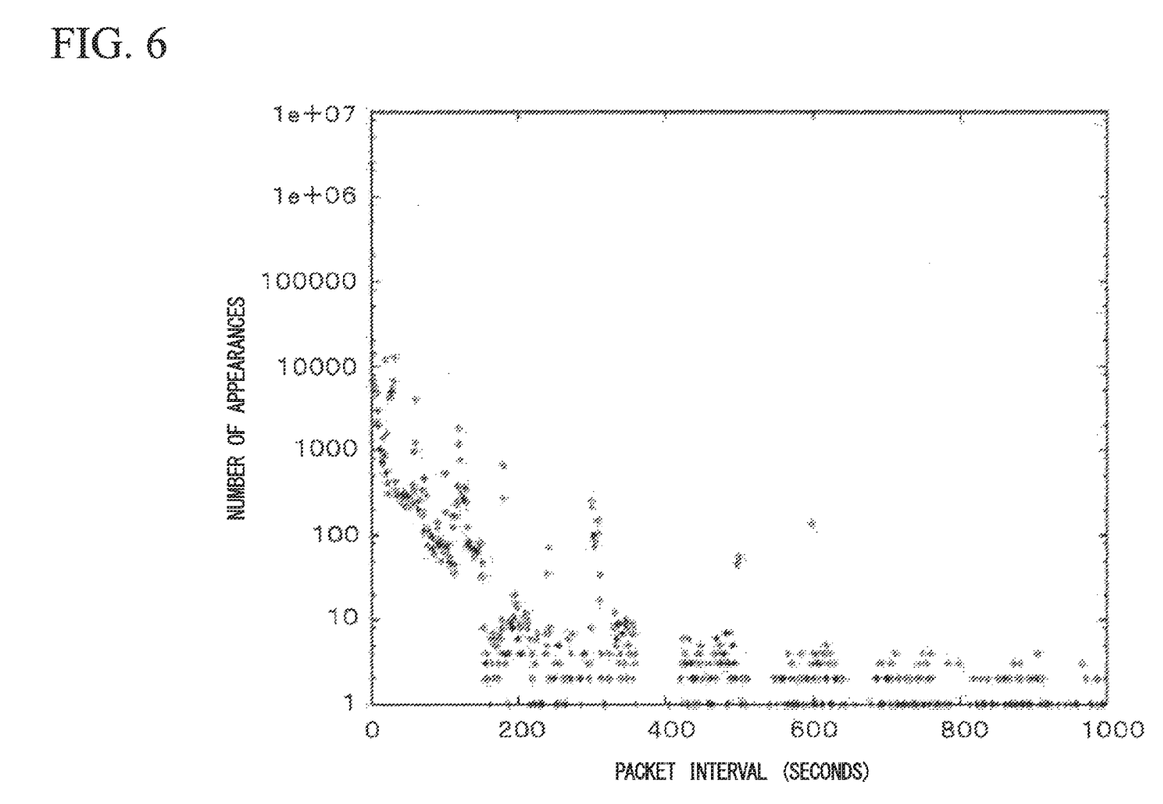
FIG. 6 is a graph representing a specific example of an appearance frequency distribution obtained for calculated packet intervals.

FIG. 6 is a histogram illustrating an example of a frequency distribution obtained using the cumulative distribution function computing unit 122. In the histogram illustrated in this figure, a packet interval is represented as a class of a horizontal axis and the number of appearances is represented as a frequency of a vertical axis.

Next, the cumulative distribution function computing unit 122 obtains the appearance probability of the packet interval Tp using the cumulative distribution function based on the frequency distribution related to the appearance frequency of the packet interval Tp obtained as described above.

Figure 7:
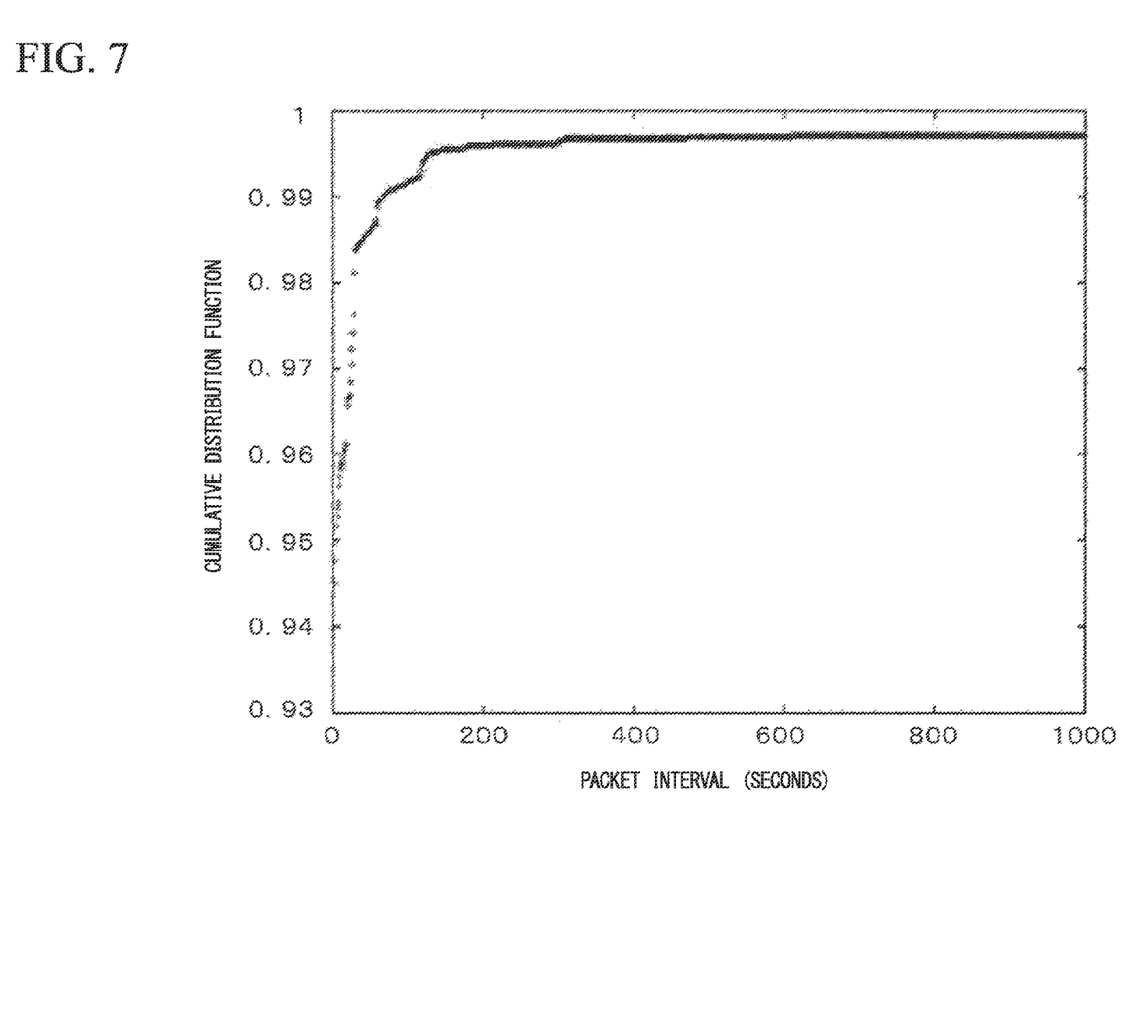
FIG. 7 is a graph representing a cumulative distribution function of packet intervals obtained based on the appearance frequency distribution illustrated in FIG. 6.
Figure 8:
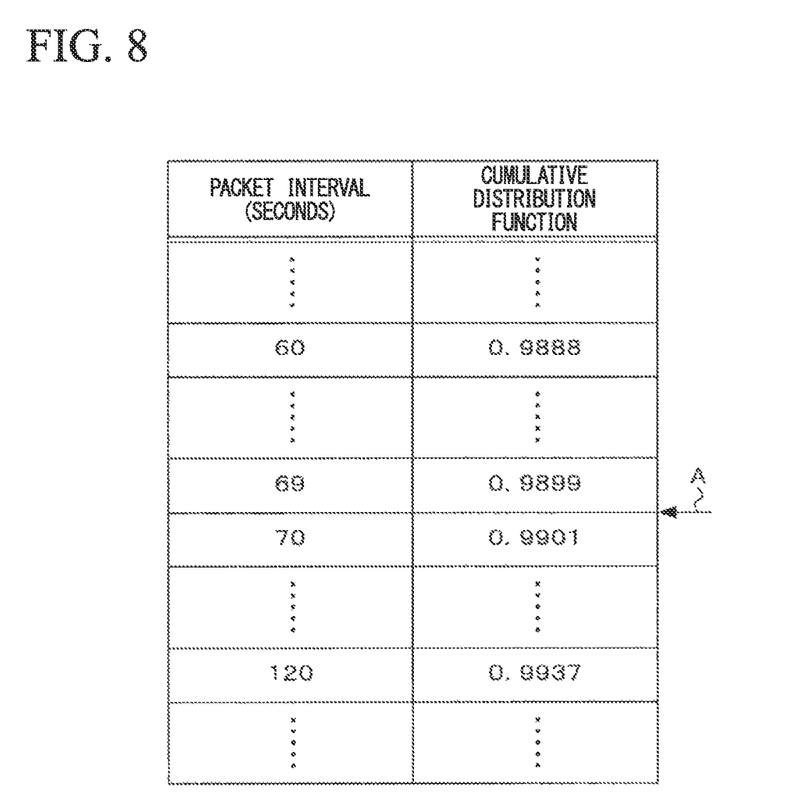
FIG. 8 is a table representing a part of the quantified appearance frequency distribution illustrated in FIG. 7.

FIG. 7 shows the cumulative distribution function obtained from the frequency distribution illustrated in FIG. 6 in a graph. In this graph, a horizontal axis represents the packet interval Tp and a vertical axis represents a value of the cumulative distribution function. FIG. 8 illustrates a table of the cumulative distribution function illustrated in FIG. 7. In this way, the cumulative distribution function computing unit 122 acquires the value of the cumulative distribution function in correspondence with each packet interval Tp calculated using the packet interval calculating unit 121.

The packet interval-corresponding to-threshold acquisition unit 123 acquires a value of the packet interval Tp as a threshold based on the cumulative distribution function of the packet interval Tp exemplified in FIGS. 7 and 8 and the function value-corresponding to-flow end 132. The function value-corresponding to-flow end 132 indicates a boundary value of the cumulative distribution function to be considered as the end of flow communication (timeout) in the range of the value of the cumulative distribution function from 0 to 1. Then, the packet interval-corresponding to-threshold acquisition unit 123 acquires a value of the packet interval Tp mapped to a cumulative distribution function value that matches a value indicated as the function value-corresponding to-flow end 132, and sets the acquired packet interval Tp as the threshold.

A specific example of acquiring the packet interval Tp corresponding to the threshold using the packet interval-corresponding to-threshold acquisition unit 123 will be described by referring again to FIG. 8. In description herein, it is assumed that the function value-corresponding to-flow end 132 is set to "0.99 (99%)." This value is intended and set such that a packet interval Tp corresponding to the range from 0% to 99% of the cumulative distribution function is not detected as the timeout and a packet interval Tp corresponding to 99% or more is detected as the timeout.

In FIG. 8, the cumulative distribution function value of "0.99" indicated by the function value-corresponding to-flow end 132 corresponds to a boundary between the cumulative distribution function of "0.9899" and the cumulative distribution function of "0.9901" as indicated by an arrow A.

Therefore, the packet interval-corresponding to-threshold acquisition unit 123 in this case uses the cumulative distribution function of "0.9901" as a value that matches the function value-corresponding to-flow end 132 of "0.99." The packet interval Tp of 70 (seconds) is mapped to the cumulative distribution function of "0.9901." Therefore, the packet interval-corresponding to-threshold acquisition unit 123 specifies the packet interval Tp=70 (seconds) as the threshold.

Accordingly, the timeout detecting unit 114 compares a measuring packet stop period and the threshold of 70 seconds. When the packet stop period is equal to or greater than 70 seconds, it is detected as occurrence of the timeout.

Next, an example of sleep control using the sleep control unit 115 will be described with reference to FIG. 9. In FIG.

9, a flow continuation period Tctn indicates a period during which a certain one flow continues. In the flow continuation period Tctn, as illustrated, packets Pkt corresponding to the flow are sequentially transmitted. A time tend at which reception of the last packet Pkt ends in the flow continuation period Tctn is a flow end timing. When it is assumed that the flow continuation period Tctn is not forcibly terminated but is terminated normally, the FIN flag or the RST flag in the last packet Pkt in the flow continuation period Tctn indicates on.

Then, it is considered that a period from the time tend to a time tsta, which is a period from ending of the flow continuation period Tctn to restarting of a next flow continuation period Tctn, is a flow stop period Tstp during which flow communication stops. At a time point at which a detection result corresponding to the flow end is obtained using the flag detecting unit 113 or the timeout detecting unit 114, the flow stop period Tstp is substantially started, and the sleep control unit 115 sets the sleep state in this flow stop period Tstp.

Here, it is also possible to operate the sleep control unit 115 to set the sleep state whenever the flow stop period Tstp arrives. However, when the sleep state is set in the flow stop period Tstp, it is necessary to release the sleep state and set as a start-up state at a timing before reaching the time tsta at which a next flow starts. To this end, as illustrated in FIG. 9, the flow stop period Tstp is formed to include a sleep target period Tslp capable of setting the sleep state and a start-up period Tu to be followed. The start-up period Tu is a period from a time at which the sleep state is released to activation of the data transmission apparatus 100 is started and a time at which communication becomes possible.

Here, the start-up period Tu is constant and differs depending on apparatuses. In general, a relatively long time of about several tens of milliseconds to several seconds is necessary.

In the start-up period Tu, power Pu at the time of a start-up state in which the sleep state transits to an operating state is higher than power Pi at the time of the sleep state. To this end, when the flow stop period Tstp becomes short due to a relatively high flow reception frequency, a ratio of the start-up period Tu increases. Therefore, a power consumption reduction effect may decrease.

Then, the sleep control unit 115 according to the embodiment determines whether the sleep state is set when the sleep control is performed as follows. That is, under a time length of a current flow stop period Tstp, the sleep control unit 115 compares power consumption when the sleep state is set and power consumption when no sleep state is set. Then, if the power consumption when the sleep state is set is small, it is determined that the sleep state is set, and otherwise, it is determined that no sleep state is set.

Specifically, the sleep control unit 115 may determine that the sleep state is set when the following conditional expression is true.

$$\{(Tstp-Tu) \times Ps + Tu \times Pu\} < \{(Tstp \times Pi)\}$$

Figure 9:
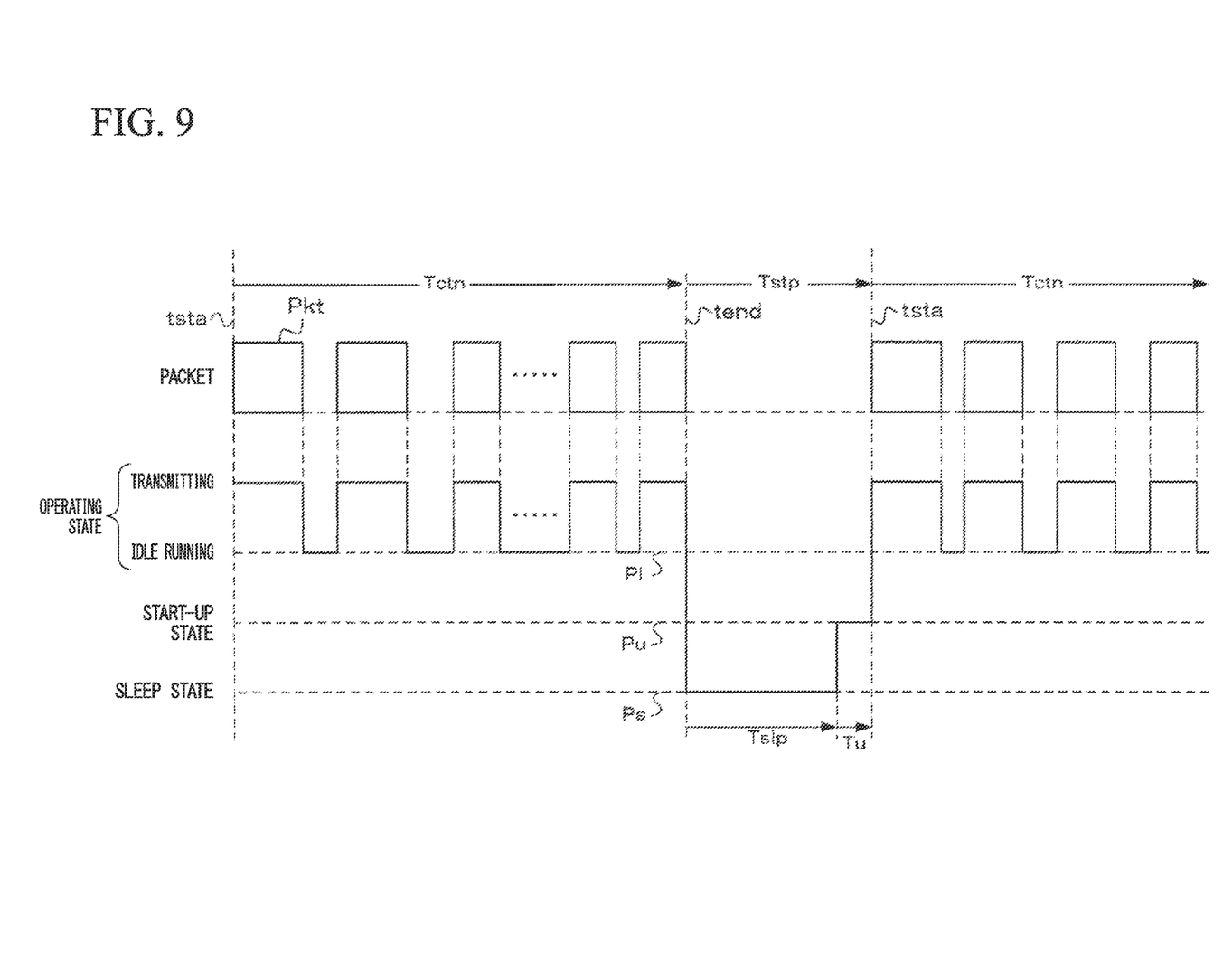
FIG. 9 is a timing chart representing a relation between sleep control and a flow timing according to the present embodiment.

As can be understood from FIG. 9, the left side of the conditional expression represents power consumption of the flow stop period Tstp when the sleep state is set in the sleep target period Tslp. The right side represents power consumption of the flow stop period Tstp when no sleep state is set in the sleep target period Tslp.

In addition, in the above conditional expression, power Pi at the time of idle running of the operating state, power Pu at the time of a start-up state, and power Ps at the time of a sleep state are known values determined by a specification of the data transmission apparatus 100. Further, the flow stop period Tstp may be predicted using, for example, a probability distribution or an average value of a time length during which a previously measured flow continuation period Tan ends and a next flow continuation period Tctn starts. Then, the start-up period Tu is a known value determined by a specification of the data transmission apparatus 100.

[Exemplary Process]

Figure 10:
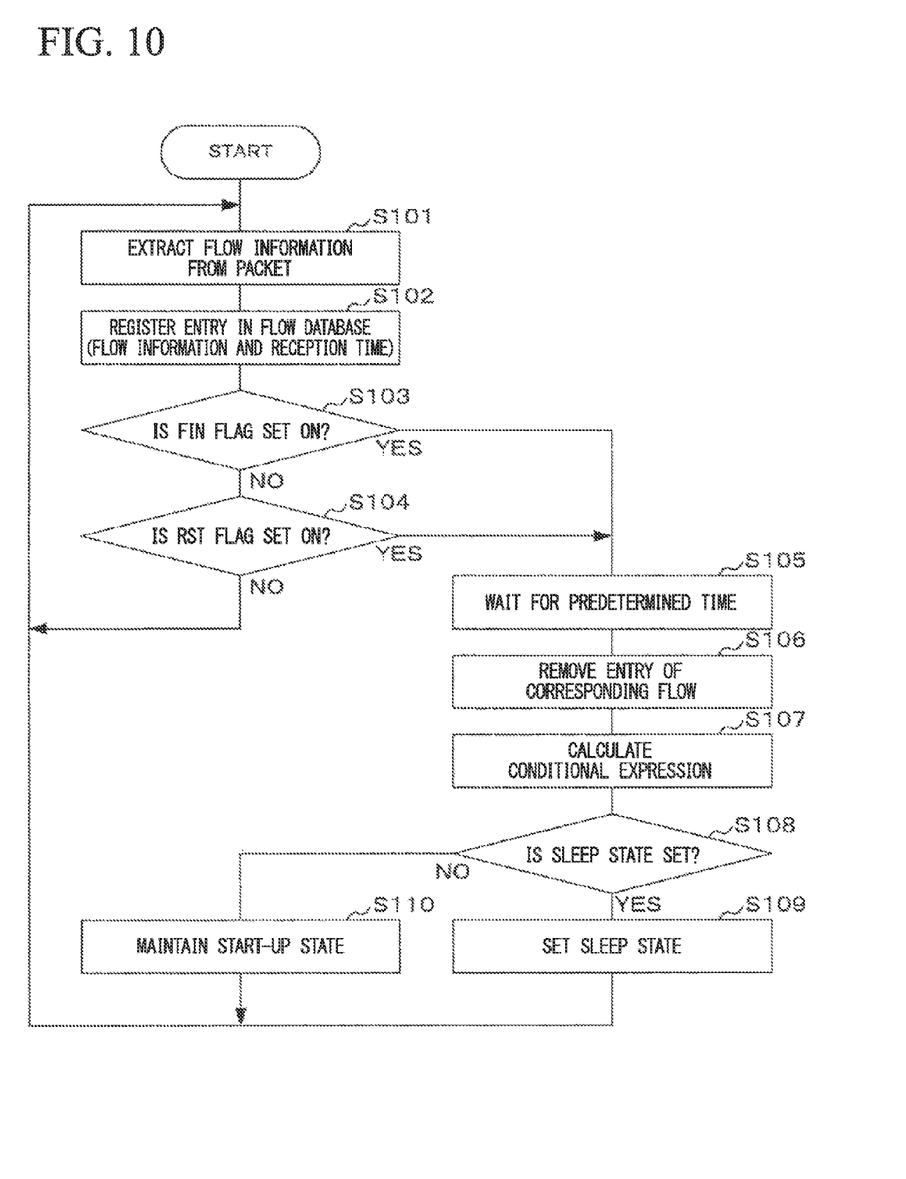
FIG. 10 is a flowchart representing an exemplary process for sleep control based on detection of an FIN flag or an RST flag according to the present embodiment.

A flowchart of FIG. 10 illustrates an exemplary process for sleep control of the data transmission apparatus 100 performed based on the state of the FIN flag or the RST flag. The process illustrated in this figure may be appropriately performed by any of functional units in the CPU 101 illustrated in FIG. 3.

First, the flow information extracting unit 111 extracts the above-described flow information from a packet acquired using the packet transmission unit 142 (step S101). The flow database management unit 112 forms the entry 131 including the extracted flow information and the reception time and registers the entry 131 in the flow database 130 (step S102).

Next, the flag detecting unit 113 detects whether the FIN flag is set on in the packet from which the flow information is extracted in step S101 (step S103).

When it is detected that no FIN flag is set on (No in step S103), the flag detecting unit 113 detects whether the RST flag is set on in the packet from which the flow information is extracted in step S101 (step S104).

When it is determined that no RST flag is set on (No in step S104), flow communication is not yet terminated. Therefore, in this case, the process returns to step S101, and a process of detecting the flag is performed for a next packet.

On the other hand, when it is detected that the FIN flag is set on (Yes in step S103) or when it is detected that the RST flag is set on (Yes in step S104), the following process is performed.

First, the sleep control unit 115 waits for a predetermined time after a time point of detecting that the FIN flag or the RST flag is set on as described above (step S105).

The reason to wait for the predetermined time in step S105 is that, even when the FIN flag and RST flag of the packet are set on, there is a possibility that the packet is not the last packet in flow communication. Examples of a packet that has the FIN flag and RST flag set on and is not the last packet include a packet used to send back ACK from a side which has received the packet having the FIN flag or RST flag set on and ACK of a wireless LAN frame.

The waiting time in step S105 may be set in consideration of a time necessary to complete communication of a packet such as the packet communication of ACK.

In addition, the flow database management unit 112 removes an entry 131 of a packet corresponding to a flow of which communication is detected as being terminated using a currently detected FIN flag or RST flag from the flow database 130 (step S106). In this way, it is possible to prevent a capacity of the flow database 130 from increasing.

Next, the sleep control unit 115 calculates the conditional expression as previously described in FIG. 9 (step S107), and determines whether the sleep state is set based on a calculation result (step S108).

When it is determined that the sleep state is set (Yes in step S108), the sleep control unit 115 performs control such that the power supply unit 105 sets the sleep state in the sleep target period Tslp as described in FIG. 9 (step S109). On the other hand, when it is determined that no sleep state is set (No in step S108), the power supply unit 105 is controlled such that the start-up state is maintained in the flow stop period Tstp (step S110).

Figure 11:
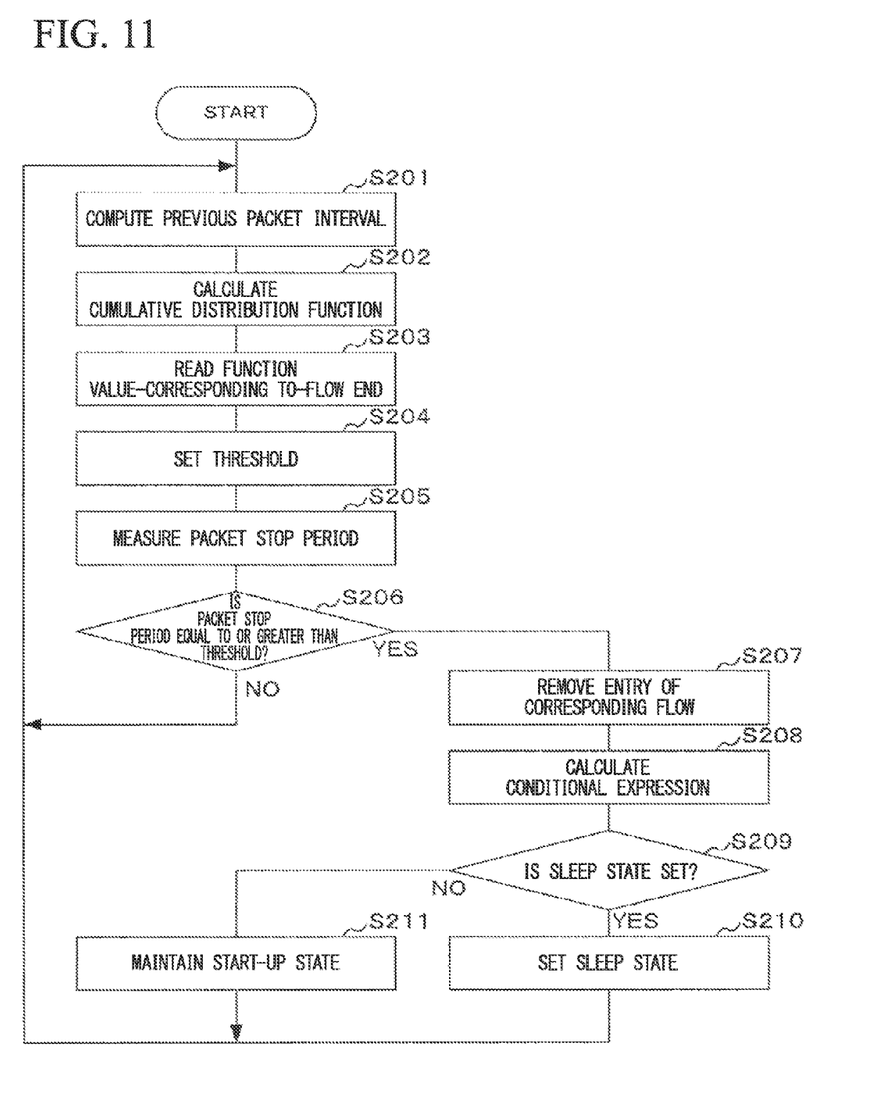
FIG. 11 is a flowchart representing an exemplary process for sleep control based on timeout detection according to the present embodiment.

A flowchart of FIG. 11 illustrates an exemplary process used to implement sleep control performed based on a timeout detection result. The process illustrated in this figure is performed in parallel with the sleep control process illustrated in FIG. 10. In addition, the process illustrated in this figure may be appropriately performed by any of functional units in the CPU 101 illustrated in FIG. 3.

First, in the threshold setting unit 120, the packet interval calculating unit 121 calculates the packet interval Tp for previously received packets as previously described in FIG. 5 (step S201). Next, the cumulative distribution function computing unit 122 obtains the cumulative distribution function for the packet interval Tp as previously described in FIGS. 6 and 7 (step S202).

Next, the packet interval-corresponding to-threshold acquisition unit 123 reads the function value-corresponding to-flow end 132 from the storing unit 103 (step S203), and acquires the packet interval Tp mapped to the cumulative distribution function that matches the function value-corresponding to-flow end as previously described in FIG. 8. Then, a value of the packet interval Tp is set as a threshold (step S204).

The timeout detecting unit 114 measures the packet stop period as described above (step S205) and determines whether the measured packet stop period is equal to or greater than the threshold (step S206). Here, when it is determined that the packet stop period is less than the threshold (No in step S206), the process returns to step S201. On the other hand, when it is determined that the packet stop period is equal to or greater than the threshold (Yes in step S206), the process of steps S207 to S211 is performed. The process of steps S207 to S211 is the same as the process of steps S106 to S110 in FIG. 10.

In this manner, in the embodiment, the threshold used to detect the timeout may be dynamically set based on a previous packet interval. That is, the threshold is appropriately set depending on, for example, occurrence characteristics or an operation policy of a current flow. As a result, when flow communication is forcibly terminated, it is possible to increase precision of a detection timing of a corresponding flow communication end. In addition, as in the embodiment, when the sleep control is performed according to flow communication end detection, it is possible to set the sleep state at an appropriate timing. As a result, it is possible to increase a power consumption reduction amount by setting of the sleep state.

The sleep state in the above-described embodiment is called, for example, a pause state. As can be understood from the above description, the sleep state in the embodiment refers to a state in which power supply to a predetermined circuit unit is stopped or a voltage value of supplied power supply voltage is decreased and thus power consumption is less than that of the operating state.

In addition, when the threshold used to detect the timeout according to the embodiment is set, it is possible to consider, for example, a method of obtaining an average value of certain previous packet intervals. However, the number of packet intervals used to set the threshold is actually large. Therefore, as in the embodiment, when the threshold is set based on the appearance probability of the packet intervals, it is highly reliable. In addition, as in the embodiment, if the cumulative distribution function is obtained, even when a fixed threshold is set, it is possible to specify the appearance probability of the packet interval Tp to be detected the timeout corresponding to the threshold. Specifically, when the threshold of 120 seconds is set and the cumulative distribution function of FIG. 8 is obtained, in the packet interval Tp having appearance probability, it is possible to specify that the probability of being detected as the timeout is 0.63% (=1−0.9937).

In addition, the flow end detection according to the embodiment may also be applied to, for example, traffic control, in addition to the sleep control.

In addition, the data transmission apparatus includes a computer. Thus, the process of the above-described sleep control is recorded in computer readable recording media in the form of a program. The computer reads and executes the program and thus the process is performed. Here, examples of the computer readable recording media include a magnetic disk, a magneto-optical disc, a CD-ROM, a DVD-ROM, and a semiconductor memory. In addition, the computer program may be distributed to the computer through a communication line, and the computer that has received the distribution may execute the program.

In addition, various processes may be performed such that a program used to implement the functional unit illustrated in FIG. 3 is recorded in the computer readable recording media and a computer system reads and executes the program recorded in the recording media. The term "computer system" used herein includes an OS or hardware such as peripheral devices. In addition, the "computer system" also includes a WWW system having a website providing environment (or a display environment). In addition, the term "computer readable recording media" includes portable media such as a flexible disk, a magneto-optical disc, a ROM, and a CD-ROM, and a storage device built in the computer system such as a hard disk. Moreover, the "computer readable recording media" include media that maintain a program for a predetermined time like a volatile memory (RAM) in the computer system serving as a server or a client when the program is transmitted through a network such as the Internet or a communication line such as a telephone line.

In addition, the program may be transmitted from the computer system in which the program is stored in, for example, the storage device, to another computer system through transmission media or a transmission wave in the transmission media. Here, the term "transmission media" used to transmit the program refers to media that have a function of transmitting information like a network (communication network) such as the Internet or a communication circuit (communication line) such as a telephone line. In addition, the program may also include a program used to implement a part of the above-described function and include a differential file (differential program) in which the above-described function is implemented in combination with a program that has already been recorded in the computer system.

Priority is claimed on Japanese Patent Application No. 2011-192640, filed on Sep. 5, 2011, the content of which is incorporated herein by reference.

INDUSTRIAL APPLICABILITY

According to the communication apparatus in the present invention, a predetermined time for determining a timeout of data communication is appropriately set. Therefore, it is possible to increase precision of data communication end timing detection.

DESCRIPTION OF REFERENCE SYMBOLS 100 data transmission apparatus
101 CPU

102 RAM
103 storing unit
104 communication unit
105 power supply unit
106 data bus
111 flow information extracting unit
112 flow database management unit
113 flag detecting unit
114 timeout detecting unit
115 sleep control unit
120 threshold setting unit
121 packet interval calculating unit
122 cumulative distribution function computing unit
123 packet interval-corresponding to-threshold acquisition unit
130 flow database
131 entry
132 function value-corresponding to-flow end
200 communication terminal apparatus
300 communication terminal apparatus
400 backbone network

The invention claimed is:

1. A communication apparatus, comprising:
a threshold setting unit configured to dynamically set a threshold based on a packet interval that is a difference between reception times of a plurality of previously consecutively received packets; and
a timeout detecting unit configured to detect a flow end by comparing a packet stop period, counted from a packet reception time to a current time, with the threshold,
wherein the threshold setting unit further includes
a packet interval calculating unit configured to calculate the packet interval of a plurality of packets corresponding to each previously received flow;
a cumulative distribution function computing unit configured to obtain a cumulative distribution function of the packet interval; and
a packet interval-to-threshold acquisition unit configured to acquire, from the cumulative distribution function, a packet interval mapped to a cumulative distribution function value that matches a function value which is previously set to indicate a boundary value of the cumulative distribution function assumed as the flow end, thus setting the acquired packet interval to the threshold.

2. The communication apparatus according to claim 1, wherein the packet interval calculating unit further includes
a flow database management unit configured to calculate the packet interval using an entry which includes a reception time and flow information indicating a flow for each previously received packet stored in the flow database, wherein the flow database management unit creates the entry corresponding to the received packet, registers the entry in the flow database, and removes the entry of a packet corresponding to a flow that is detected as a timeout using the timeout detecting unit from the flow database.

3. The communication apparatus according to claim 1, further comprising
a flow detecting unit configured to detect the flow ends based on a flag indicating the flow end stored in the received packet.

4. The communication apparatus according to claim 1, further comprising
a sleep control unit configured to set a sleep state in a period during which the flow stops upon detecting the flow end.

* * * * *